(12) United States Patent
Ott et al.

(10) Patent No.: US 9,244,649 B2
(45) Date of Patent: Jan. 26, 2016

(54) PILOTING ASSISTANCE SYSTEM AND AN AIRCRAFT

(75) Inventors: Adrien Ott, Salon de Provence (FR); Serge Germanetti, Marseilles (FR); Pierre Boudier, Bouc Bel Air (FR)

(73) Assignee: Airbus Helicopters, Marignane (FR)

( * ) Notice: Subject to any disclaimer, the term of this patent is extended or adjusted under 35 U.S.C. 154(b) by 561 days.

(21) Appl. No.: 13/487,716

(22) Filed: Jun. 4, 2012

(65) Prior Publication Data

US 2012/0314034 A1    Dec. 13, 2012

(30) Foreign Application Priority Data

Jun. 10, 2011    (FR) ..................................... 11 01786

(51) Int. Cl.
| | |
|---|---|
| G06F 3/147 | (2006.01) |
| G01C 23/00 | (2006.01) |
| G02B 27/01 | (2006.01) |
| G09G 3/00 | (2006.01) |
| B64D 10/00 | (2006.01) |
| H04N 13/04 | (2006.01) |

(52) U.S. Cl.
CPC ............. *G06F 3/147* (2013.01); *B64D 10/00* (2013.01); *G01C 23/00* (2013.01); *G02B 27/01* (2013.01); *G02B 27/017* (2013.01); *G09G 3/003* (2013.01); *H04N 13/044* (2013.01); *G02B 2027/014* (2013.01); *G02B 2027/0138* (2013.01); *G09G 2380/12* (2013.01)

(58) Field of Classification Search
CPC ....... H04N 13/044; G09G 3/003; G02B 27/01
See application file for complete search history.

(56) References Cited

U.S. PATENT DOCUMENTS

| | | | | |
|---|---|---|---|---|
| 4,994,794 | A * | 2/1991 | Price et al. ..................... | 345/7 |
| 5,493,595 | A * | 2/1996 | Schoolman .................... | 378/41 |
| 6,160,666 | A * | 12/2000 | Rallison et al. ............... | 359/630 |
| 2005/0232469 | A1* | 10/2005 | Schofield et al. ............. | 382/104 |
| 2006/0001553 | A1* | 1/2006 | Hedrick ......................... | 340/971 |
| 2008/0184115 | A1* | 7/2008 | Back et al. ..................... | 715/702 |
| 2010/0123839 | A1* | 5/2010 | Lu .................................. | 349/15 |
| 2011/0071708 | A1* | 3/2011 | Chaniot et al. ................ | 701/3 |
| 2011/0128347 | A1* | 6/2011 | Theobald ....................... | 348/36 |
| 2011/0194029 | A1* | 8/2011 | Herrmann et al. ............ | 348/569 |
| 2011/0298826 | A1* | 12/2011 | Namba ........................... | 345/635 |

FOREIGN PATENT DOCUMENTS

| | | |
|---|---|---|
| EP | 1116210 A1 | 7/2001 |
| EP | 1344021 A1 | 9/2003 |
| EP | 1757906 A2 | 2/2007 |
| EP | 1762825 A2 | 3/2007 |
| EP | 2254039 A1 | 11/2010 |
| WO | 2005124685 A1 | 12/2005 |

OTHER PUBLICATIONS

Search Report and Written Opinion; Application No. FR 1101786; dated Nov. 16, 2011.

* cited by examiner

*Primary Examiner* — Thai Tran
*Assistant Examiner* — Christopher T Braniff
(74) *Attorney, Agent, or Firm* — Brooks Kushman P.C.

(57) ABSTRACT

The present invention relates to a piloting assistance system for an aircraft that is provided with a controller for determining piloting information. The system comprises at least one display system wearable on the head of a pilot, the display system being provided with a left display suitable for being viewed by a left eye of the pilot and a right display suitable for being viewed by a right eye of the pilot, the controller including a first processor for processing the information and a second processor for processing the information, the processors including stored instructions for causing the information to be displayed simultaneously and respectively on the left display and on the right display.

19 Claims, 4 Drawing Sheets

PILOTING ASSISTANCE SYSTEM AND AN AIRCRAFT

CROSS REFERENCE TO RELATED APPLICATIONS

This application claims priority to French patent application FR 11 01786 filed on Jun. 10, 2011, the disclosure of which is incorporated in its entirety by reference.

BACKGROUND OF THE INVENTION (1) Field of the Invention

The present invention relates to a piloting assistance system and to an aircraft including said system.

More particularly, the piloting assistance system lies in the technical field of helmet-mounted devices for displaying information, sometimes referred to as a "helmet display or visor".

It should be observed that the term "piloting assistance system" is used to cover both a system for assisting short-time piloting as such, and also a system for providing assistance in navigating and monitoring the aircraft.

(2) Description of Related Art

Devices are known that present an aircraft pilot with an image representing the environment outside the aircraft, on the basis of night vision or infrared sensors, or when weather conditions are bad, for example. The image is displayed for example on the pilot's helmet-mounted display means, or indeed on so-called "head-up" display means.

It is recalled that when the pilot looks at the outside environment through the windshield of an aircraft, it is common practice to say that the pilot is in a "head-up" position. Conversely, when the pilot is looking at the inside of the cockpit, and in particular at an instrument panel, it is common practice to say that the pilot is in a "head-down" position.

By way of example, the device known under the name "VIGILX®" is known.

That device includes infrared optical cameras for taking a panoramic night image or for use when flying with reduced visibility, in particular.

Furthermore, it is possible to display a digital representation of the environment superimposed on the image as obtained from that device, the digital representation being taken from a digital model of the terrain.

The image may be displayed on a "head-down" screen or indeed it may be projected onto a visor of a helmet.

A device is also known that has a piloting camera with the camera's line of sight being slaved to the position of a pilot's helmet. However, it will be understood that the device is then controlled solely by the movements of the head of only one member of the crew.

It is also common practice to perform a cyclic redundancy check (CRC) for detecting the presence of errors in a signal. Reference may be made to the literature to obtain more information about such a check.

It is also possible to perform such checking, e.g. in order to verify that the image sent to a "head-down" screen or indeed to a helmet visor is not erroneous.

Nevertheless, it should be observed that the calculation needed is relatively complex and lengthy to perform.

Furthermore, the technological background includes in particular the following documents: EP 1 116 210 B1; EP 1 344 021 B1; EP 1 757 906 A2; WO 2005/124685 A1; EP 2 254 039 A1; and EP 1 762 825 A2.

Document EP 1 116 210 B1 describes a flat screen system for displaying data relating to aircraft system parameters, the system having a flat screen and two processors, each interfaced with a graphics color generator.

Document EP 1 344 021 B1 relates to a flat screen display system.

Similarly, document EP 1 757 906 A2 relates to such a system that is provided with a general purpose processor receiving data from on-board sensors and with a graphics processor for generating pixelized images from a video memory, the general purpose processor including an integrity-checking function for verifying at least one pixel of the image.

Document WO 2005/124685 A1 describes a system for verifying the accuracy of an image generated by a display processor, by using a correlator circuit.

Document EP 2 254 039 A1 describes a display module having means for verifying a portion of an image generated by a processor.

Document EP 1 762 825 A2 relates to a flat screen provided with means for verifying the integrity of an image.

Document US 2010/0123839 describes a method serving in particular to produce three-dimensional images.

In that method, an image is produced and information relating to the position of the head of a person is determined. Under such circumstances, the computer determines which light-emitting diodes (LEDs) of a display means should be used for emitting images respectively and sequentially to the left eye and to the right eye.

BRIEF SUMMARY OF THE INVENTION

The present invention thus seeks to propose a piloting assistance system suitable for sending an image rapidly to a plurality of pilots.

According to the invention, a piloting assistance system for an aircraft is provided with determination means for determining piloting information.

The piloting assistance system is remarkable in particular in that it comprises at least one display system wearable on the head of a pilot, the display system being provided with left display means suitable for being viewed by a left eye of the pilot and right display means suitable for being viewed by a right eye of the pilot, the determination means including first processor means for processing the piloting information and second processor means for processing the piloting information, the processor means including stored instructions for causing the information to be displayed simultaneously and respectively on the left display means and on the right display means.

Under such circumstances, determination means are implemented for determining piloting information, which information may include data or indeed an image representing the environment outside the aircraft, for example.

The information is processed not by a single computer, but by first processor means and second processor means so as to be displayed respectively not by single display means, but on left display means visible by the left eye of the pilot and on right display means visible by the right eye of the same pilot.

The left display means and the right display means comprise two means of a portable display system that is arranged on a helmet or on eyeglasses worn by a pilot.

The device does not involve implementing lengthy processing methods in order to verify that the transmitted information is consistent, such as performing a cyclic redundancy check. If one of the processor means is faulty, the information displayed on the left display means will differ from the information displayed on the right display means. The pilot then observes the mismatch and deduces that there is a malfunction.

It can be understood that verifying consistency in the transmitted information ends up being performed quickly by the pilot's brain.

Furthermore, it may be observed that the information may be displayed on a plurality of display systems, e.g. on a display system of a pilot and on a display system of a copilot. Under such circumstances, using the same information determination means, it is possible to transmit the information to a plurality of display systems.

The invention may also include one or more of the following additional characteristics.

For example, the piloting assistance system may include at least one primary data sensor of the piloting information display means, which primary data sensor is connected to the first processor means and to the second processor means. The first processor means and the second processor means consequently include stored instructions for determining at least one item of information relating to data to be selected from a list including at least:

a speed of rotation of a rotary wing;
the attitude of the aircraft;
an air speed of the aircraft;
a barometric altitude of the aircraft;
a height of the aircraft;
a quantity of fuel remaining on board the aircraft;
a load factor of the aircraft; and
first limit information for a power plant of the aircraft.

The system may thus comprise a set of data sensors transmitting data from said list to each of the processor means. The data sensors may be of conventional type. It will be understood that the term "data sensor" covers any equipment suitable for delivering useful information for piloting an aircraft.

Consequently, each processor means determines information for display on the basis of primary information coming from data sensors. Each display means then acts as a symbol generator suitable for causing symbols to be displayed that relate to the data.

In another aspect, the piloting assistance system may include image capture means of the piloting information determination means.

The image capture means are provided with at least one camera connected to the first processor means and to the second processor means.

The first processor means and the second processor means include stored instructions for reconstituting an image of the outside of the aircraft by using the capture means.

It should be observed that the term "image" is used to cover a representation of the terrain present outside the aircraft.

Furthermore, the term "camera" designates equipment suitable for transmitting an indication of the representation of an element of the outside environment. Under such circumstances, the capture means may for example include at least one camera as such, an infrared optical sensor also referred to as an "infrared optical sensor", or indeed at least one low light level optical sensor.

The first processor means and the second processor are capable of reconstructing a representation of the outside environment.

Under such circumstances, the first processor means and the second processor means may cause information including a reconstructed image to be displayed simultaneously and respectively on the left display means and on the right display means.

It should be observed that the display of the image may be restricted to certain stages of flight.

For example, in a normal view of visual flying, the display system may display only primary information relating to the above-described data, in particular.

In contrast, in night- or instrument-flying mode, the display system may also display an image representing the environment constituted by the terrain situated outside the aircraft.

It is thus possible to inhibit displaying the image except during stages of flying at night or on instruments.

In an embodiment, the capture means may include at least one image sensor of the type used in the "VIGILX®" type connected to the first processor means and to the second processor means.

In another embodiment, the capture means comprise a plurality of cameras, each pointing towards a respective sector of a sphere surrounding said aircraft.

Optionally, two adjacent cameras cover two sectors that overlap partially.

Thus, a given set of cameras can be used for displaying an outside environment on a plurality of display systems.

Furthermore, the piloting assistance system may include positioning means for determining the processor of said display system connected to the first processor means and to the second processor means. The first processor means and the second processor means include stored instructions for determining information including an image of the outside of the aircraft present in the field of view of the pilot.

Consequently, each processor means makes use of the information coming from the image capture means and from the positioning means in order to cause a representation of the outside environment as potentially visible to the person wearing the display system to be displayed. The determined image is restricted to the field of view of said person.

In another aspect, the positioning means are capable of identifying a "head-down" position of the display system as occurs when a pilot looks at the inside of the cockpit of an aircraft, the first processor means and the second processor means including stored instructions for suspending the display of the image in said "head-down" position.

Thus, while looking at the inside of the cockpit, the person wearing the display system is not bothered by the display of an image representing the outside environment.

Furthermore, the piloting assistance system may include a digital terrain model connected to the first processor means and to the second processor means. The first processor means and the second processor means include stored instructions for causing information to be displayed that includes a digital representation of the terrain simultaneously and respectively on the left display means and on the right display means.

Thus, each processor means may cause a digital representation of the terrain to be displayed superimposed on a reconstituted image of said terrain coming from image capture means, so as to consolidate the representation of the terrain.

It should be observed that the consolidated zones of the digital representation, i.e. the zones of said digital representation that correspond to zones of the image, and the non-consolidated zones of the digital representation may be displayed differently so as to enable a person wearing the display system to distinguish quickly between reliable information and information coming solely from a digital terrain model.

Furthermore, the piloting assistance system may include deactivation means for deactivating the display of the information on at least one of said display means, said deactivation means being operable by the pilot in the event of a lack of similarity between the information displayed on the left display means and on the right display means.

When a pilot wearing a display system observes a lack of similarity between the information transmitted to the left eye and the information transmitted to the right eye, that person can operate the deactivation means optionally to deactivate the left display means, or the right display means, or indeed both the left and the right display means, or indeed a fixed backup screen, where appropriate.

The deactivation means may comprise a rotary knob, for example.

In another aspect, the piloting assistance system may include at least one on-board fixed screen connected to said first and second processor means to display said information.

The fixed screen may in particular be used in the event of the portable display system malfunctioning, the fixed screen then constituting a backup screen.

In addition, the system includes positioning means capable of identifying a "head-down" position of the display system as occurs when a pilot looks at the inside of the cockpit of an aircraft, and the first processor means and the second processor means include stored instructions for displaying a representation of a virtual instrument panel.

Furthermore, the system may include touch screens arranged on the instrument panel of the aircraft.

The instrument panel may be a virtual instrument panel having real touch screens and/or voice controls. For example, the touch screens include control units that are automatically configurable as a function of the stage of flight so as to give access to the appropriate data. In an embodiment, it is possible to implement two screens, a first screen arranged horizontally and a second screen situated above the first screen but without obstructing the forward view of a pilot.

When the pilot changes to a "head-down" viewing position, the display system displays a representation of the piloting screens, and the pilot can perform the usual operations by touching the touch screen.

Optionally, the first processor means and the second processor means for processing the information include stored instructions for causing said information to be displayed simultaneously and respectively on the left display means and on the right display means from a right-eye point of view and from a left-eye point of view so as to produce a stereoscopic display.

From a digital terrain model, each processor means can calculate an image for the eye that is associated therewith, by taking account of the orientation of the pilot's head, thereby providing the pilot with a stereoscopic view. This solution makes use of the natural perception of relief by stereoscopic vision, and thus the pilots perceive the outside environment in natural manner through the various sensors used.

In addition to a piloting assistance system, the invention also provides an aircraft including such a piloting assistance system.

BRIEF DESCRIPTION OF THE SEVERAL VIEWS OF THE DRAWINGS

The invention and its advantages appear in greater detail from the following description of embodiments given by way of illustration with reference to the accompanying figures, in which.

DETAILED DESCRIPTION OF THE INVENTION

Elements that are shown in more than one of the figures are given the same references in each of them.

Figure 1:
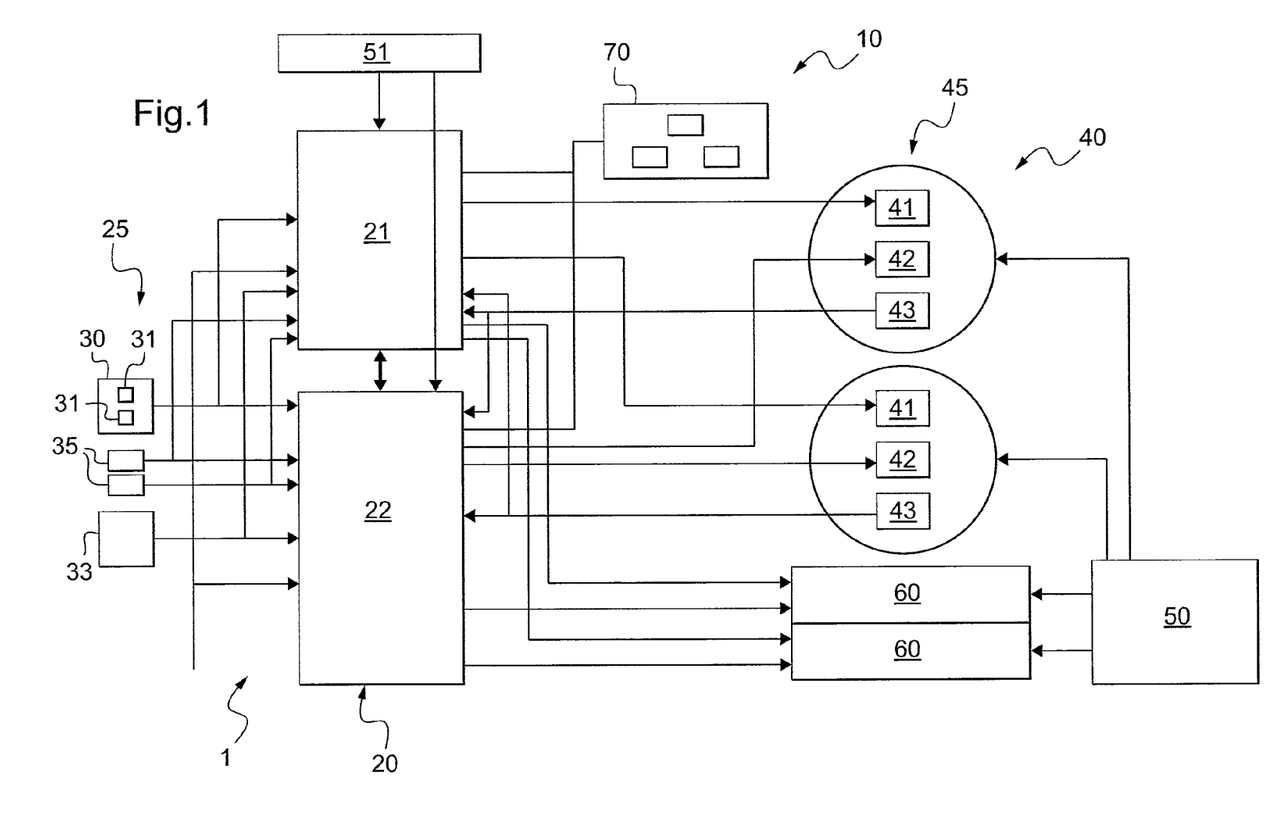
FIG. 1 is a diagram of an aircraft of the invention.

FIG. 1 shows an aircraft 1 of the invention provided with a piloting assistance system 10. It should be observed that the other members of the aircraft are not shown in order to avoid pointlessly overcrowding FIG. 1.

The piloting assistance system 10 is provided with a set of instruments 25 communicating with determination means 20. The instruments 25 transmit indications to the determination means 20 relating to information that is useful for piloting the aircraft 1. For example, the instruments 25 transmit signals to the determination means 20 relating to flight data or indeed to the environment outside the aircraft.

The piloting assistance system 10 then includes a display device 45 having at least one display system 40 for displaying this information, which system may be worn by a person. For example, the piloting assistance system 10 includes a first display system 40 arranged on the head of a pilot of the aircraft and a second display system 40 arranged on the head of a copilot of the aircraft.

Each display system 40 is provided with left display means 41 for presenting piloting assistance information to the left eye of a person and right display means 42 for presenting said information to the right eye of that person.

The left display means 41 and the right display means 42 may be arranged on a helmet or on transparent lenses of a pair of eyeglasses.

The left display means 41 and the right display means 42 may be distinct, sharing no display zone in common, or they may optionally be arranged on a common support.

Under such circumstances, the determination means include first processor means 21 communicating with the instruments 25 and second processor means 22 communicating with the same instruments 25. It should be observed that these first processor means 21 may also communicate with the second processor means 22.

Under such circumstances, the first processor means 21 comprise a processor unit, e.g. of the type comprising a microprocessor and a memory containing instructions. The processor unit of the first processor means 21 executes the stored instructions in order to process the indications coming from the instruments 25 in order to cause the information to be displayed on the left display means 41 of each display system 40.

Similarly, the second processor means 22 comprise a processor unit, e.g. of the type comprising a microprocessor and a memory containing instructions. The processor unit of the second processor means 22 executes the stored instructions in order to process the indications coming from the instruments 25 in order to cause the information to be displayed on the right display means 42 of each display system 40.

The information may include piloting assistance data and/or images showing the environment outside the aircraft.

Consequently, the instruments 25 may include primary data sensors 35 connected to the first processor means 21 and to the second processor means 22.

The term "data sensor" is used to designate any device suitable for obtaining data for facilitating the piloting of the aircraft. Thus, the first processor means 21 and the second processor means 22 include stored instructions for determining at least one item of information relating to data selected from a list that includes at least:

a speed of rotation of a rotary wing;
the attitude of the aircraft;
an air speed of the aircraft;
a barometric altitude of the aircraft;
a height of the aircraft;
a quantity of fuel remaining on board said aircraft;
a load factor of the aircraft; and
first limit information for a power plant of the aircraft.

Figure 2:
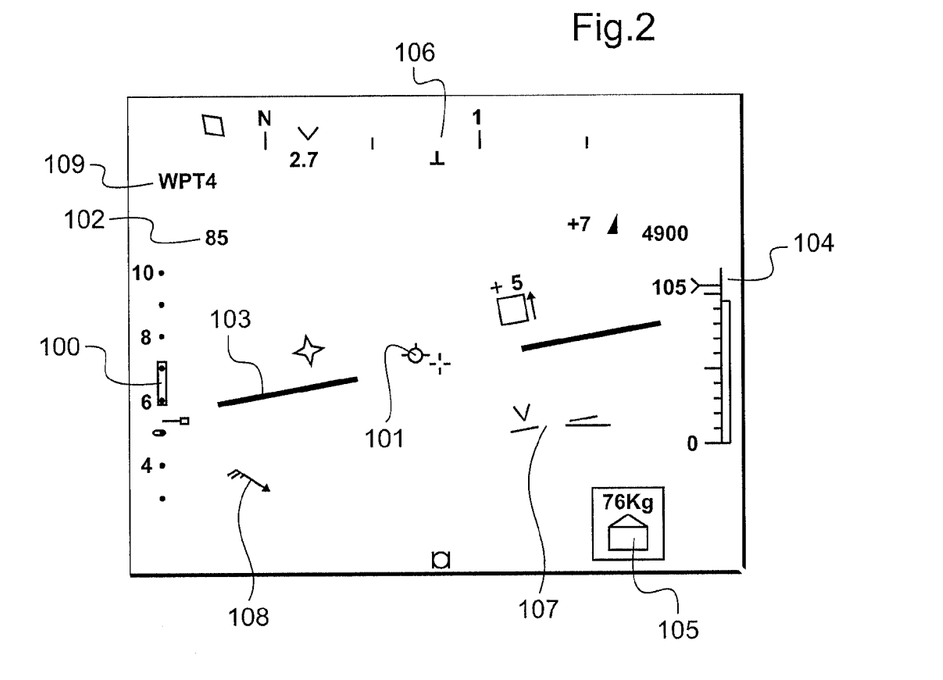
FIG. 2 is a diagram showing a data display.

With reference to FIG. 2, each processor means 21, 22 is capable of generating symbols for controlling the display on the associated display means 41, 42 of the following information obtained with the help of the requisite primary data sensors 35:

first limit information 100 for a power plant of the aircraft;
a speed vector 101;
an air speed 102 of the aircraft;
an artificial horizon 103;
a radio altimeter height 104 of the aircraft;
a quantity of fuel 105 remaining on board said aircraft;
the heading 106 followed by the aircraft;
a landing zone 107;
wind data 108 relating to the speed and/or direction of the wind; and
location data 109 relating to a flight plan waypoint that is to be reached.

For information that is of the "data" type, it is possible to implement a representation of an instrument panel. Thus, when the person looks inside the cockpit in a predetermined sector, the determination means may display a representation of the usual screen.

The instrument panel is then a "virtual" panel including real touch sensitive screens 70 enabling a pilot to request specific data to be displayed on that pilot's display system.

Furthermore, with reference to FIG. 1, the instruments 25 may include image capture means 30 for capturing images of the outside environment and connected to the first processor means 21 and to the second processor means 22.

Each processor means 21, 22 reconstitutes a representation of the outside environment and causes the corresponding image to be displayed simultaneously on the associated display means 41, 42.

The capture means may comprise at least one camera 31, i.e. means capable of picking up a representation of the outside environment.

Figure 5:
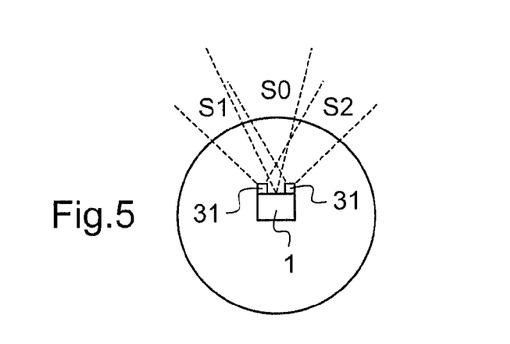
FIG. 5 is a diagram showing two cameras of capture means.

For example, with reference to FIG. 5, the capture means may comprise a plurality of cameras 31, each pointing towards a corresponding sector S1, S2 of a sphere surrounding the aircraft 1.

It should be observed that it is possible for sectors to overlap, with two adjacent sectors S1 and S2 overlapping in part.

At a given instant, the pilot looks at a field of view S0 covering parts of two adjacent sectors S1, S2 in the example of FIG. 5.

Under such circumstances, with reference to FIG. 1, in a preferred embodiment, the piloting assistance system 10 includes positioning means 43 for positioning each display system 40, with each positioning means 43 communicating with the first processor means 21 and the second processor means 22.

Consequently, each processor means may execute instructions for reconstituting an image of the outside environment as present solely in the field of view S0 of the person wearing the display system, and may request the displayed information relating to this image on the associated display means.

For example, the first processor means 21 may firstly determine an image as seen by the left eye of the pilot wearing a first display system and cause that image to be displayed on the associated left display means, and secondly determine an image as seen by the left eye of a copilot wearing a second display system and cause this image to be displayed on the associated left display means.

Likewise, the second processor means 22 may firstly determine an image as seen by the right eye of the pilot wearing a first display system and cause this image to be displayed on the right display means, and secondly determine an image seen by the right eye of the copilot wearing a second display system and cause this image to be displayed on the associated right display means.

Furthermore, the instruments 25 may include a digital terrain model 33 containing a digital representation of the outside environment.

The first processor means 21 and the second processor means 22 then include stored instructions for causing information to be displayed that includes a digital representation of the terrain simultaneously and respectively on the left display means 41 and on the right display means 42.

This representation may be displayed superimposed on an image of the outside environment as reconstituted by the determination means 20 using the capture means 30, or else an image that has been "merged" by the processor means 21 and 22.

It should be observed that some of the information need not be displayed on the display systems, at least during certain stages of flight.

For example, it is possible to display "data type" information on a continuous basis.

However, in an embodiment, the determination means 20 cause images representing the outside environment to be displayed while flying without visibility or while flying at night.

Furthermore, the positioning means 43 may identify a "head-down" position of the display system 40 as occurs when the pilot looks inside the cockpit of an aircraft, and the first processor means 21 and the second processor means 22 may include stored instructions for suspending the display of an image representing the outside environment while in the "head-down" position.

It should be observed that the piloting assistance system may also include control means 51 so as to enable a user to select the kind of information that is displayed.

By way of example, the control means 51 may make the following choices possible:

the display of "data" type information only;
the display of "image" type information only, the image including a digital representation of the outside environment and/or a representation of the environment obtained using the capture means 30, or a combination of both of them; and
the display of both "data" and "image" type information In another aspect, the piloting assistance system 10 may include at least one on-board fixed screen 60 connected to the first processor means 21 and to the second processor means 22.

The information displayed on the display system may then also be displayed on the fixed screen 60, which screen may be of the "head-up" or of the "head-down" type.

Figure 3:
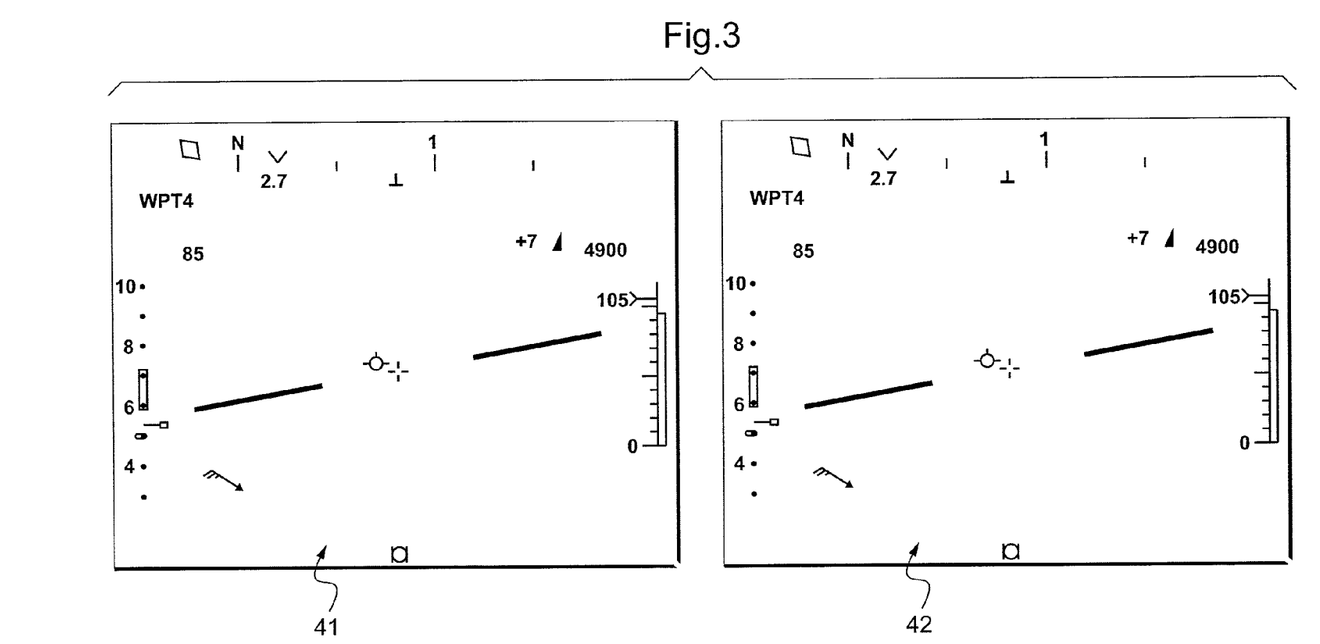
FIG. 3 is a diagram showing a consistent display of information.

Furthermore, with reference to FIG. 3, the information displayed on the left display means 41 and on the right display means 42 of display means 40 should be similar when the system is operating correctly.

Figure 4:
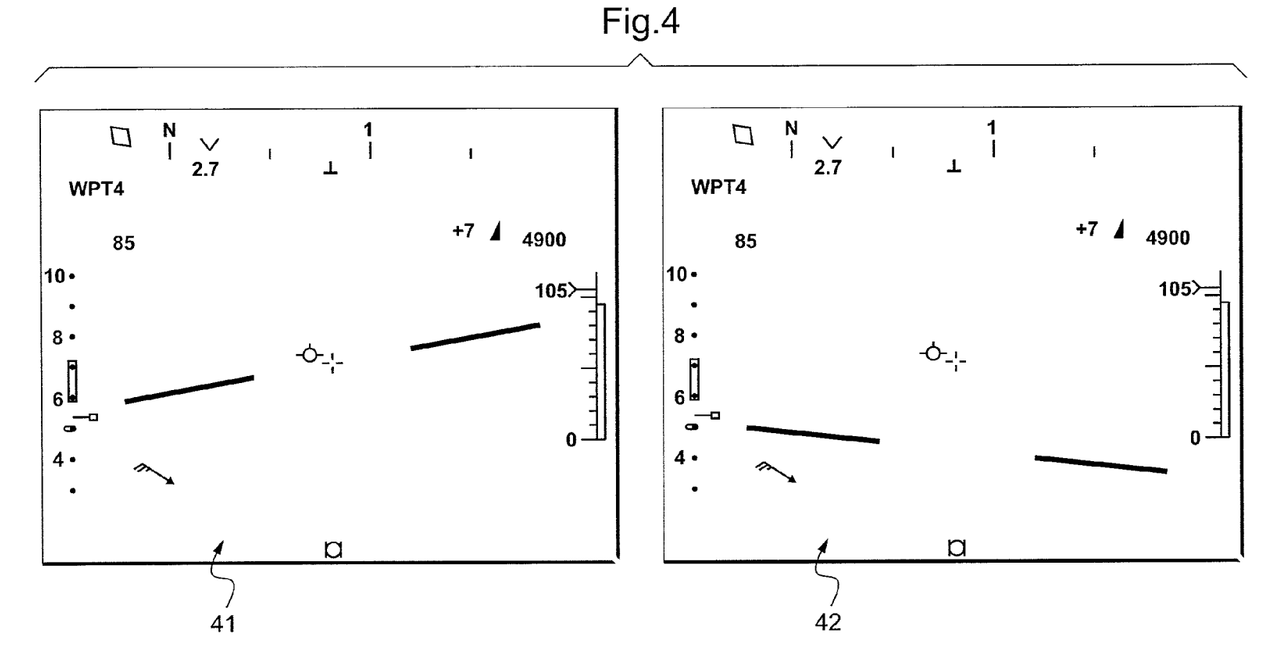
FIG. 4 is a diagram showing an inconsistent display of information.

Nevertheless, with reference to FIG. 4, in the event of a malfunction, significant differences may appear. Under such circumstances, these differences are observed by the brain of the user wearing the display system.

The pilot thus deduces that the piloting assistance system is malfunctioning.

With reference to FIG. 1, the piloting assistance system may then include control means 50 for restricting the display of information to the various left display means 41 or the various right display means 42, or indeed of the screens 60.

In addition, the first processor means 21 and the second processor means 22 acting on said information may include stored instructions for causing said information to be displayed simultaneously and respectively on the left display means 41 and on the right display means 42 from a left-eye point of view and a right-eye point of view in order to display a stereoscopic image.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A piloting assistance system for an aircraft provided with determination means for determining piloting information, wherein the system comprises at least one display system wearable on the head of a pilot, the display system being provided with left display means suitable for being viewed by a left eye of the pilot and right display means suitable for being viewed by a right eye of the pilot, the determination means including first processor means for processing the information and second processor means for processing the same information, the first processor means being associated with the left display means but not the right display means and the second processor means being associated with the right display means but not the left display means, the first and second processor means including stored instructions for causing the information to be displayed simultaneously and respectively on the left display means and on the right display means, wherein one of the left display means and the right display means is configured to deactivate in response to a user input while the other of the left display means and the right display means continues to display the piloting information.

2. A system according to claim 1, including at least one primary data sensor connected to the first processor means and to the second processor means, the first processor means and the second processor means including stored instructions for determining at least one item of information relating to data to be selected from a list including at least:
    a speed of rotation of a rotary wing;
    an attitude of the aircraft;
    an air speed of the aircraft;
    a barometric altitude of the aircraft;
    a height of the aircraft;
    a quantity of fuel remaining on board the aircraft;
    a load factor of the aircraft; and
    first limit information for a power plant of the aircraft.

3. A system according to claim 1, including image capture means provided with at least one camera connected to the first processor means and to the second processor means, the first processor means and the second processor means including stored instructions for reconstituting an image of the outside of the aircraft by using the capture means.

4. A system according to claim 3, wherein the first processor means and the second processor means cause information including the image to be displayed simultaneously and respectively on the left display means and on the right display means.

5. A system according to claim 3, including a plurality of cameras, each pointing towards a respective sector of a sphere surrounding the aircraft.

6. A system according to claim 5, wherein two adjacent cameras cover two sectors (S1, S2) that overlap partially.

7. A system according to claim 3, including positioning means for determining the position of the display system connected to the first processor means and to the second processor means, the first processor means and the second processor means including stored instructions for determining information including an image of the outside of the aircraft present in a field of view (S0) of the pilot.

8. A system according to claim 7, wherein the positioning means are capable of identifying a "head-down" position of the display system as occurs when a pilot looks at the inside of a cockpit of an aircraft, the first processor means and the second processor means including stored instructions for suspending the display of the image while in the "head-down" position.

9. A system according to claim 1, including a digital terrain model connected to the first processor means and to the second processor means, the first processor means and the second processor means including stored instructions for causing information to be displayed that includes a digital terrain representation simultaneously and respectively on the left display means and on the right display means.

10. A system according to claim 1, including deactivation means for deactivating the display of the information on at least one of the display means, the deactivation means being operable by the pilot in the event of a lack of similarity between the information displayed on the left display means and on the right display means.

11. A system according to claim 1, including at least one on-board fixed screen connected to the first and second processor means to display the information.

12. A system according to claim 1, including positioning means capable of identifying a "head-down" position of the display system as occurs when a pilot looks at the inside of a cockpit of an aircraft, and the first processor means and the second processor means include stored instructions for displaying a representation of a virtual instrument panel in response to the display system being in the "head-down" position.

13. A system according to claim 12, including touch screens arranged on the instrument panel of the aircraft.

14. A system according to claim 1, wherein the first processor means and the second processor means for processing the information include stored instructions for causing the information to be displayed simultaneously and respectively on the left display means and on the right display means from a right-eye point of view and from a left-eye point of view so as to produce a stereoscopic display.

15. An aircraft, including a piloting assistance system according to claim 1.

16. The piloting assistance system of claim 1, wherein the first processor means includes a first microprocessor and the second processor means includes a second microprocessor.

17. A piloting assistance system for an aircraft provided with a controller for determining piloting information, wherein the system comprises at least one display system wearable on the head of a pilot, the display system being provided with a left display suitable for being viewed by a left eye of the pilot and a right display suitable for being viewed by a right eye of the pilot, the determination means including a first processor for processing the information and a second processor for processing the information, the first processor and the second processor being distinct processor units, the left display being associated with only one of the first processor and second processor, the right display being associated with only the other of the first processor and second processor, the processor means including stored instructions for causing the information to be displayed simultaneously and respectively on the left display and on the right display, wherein one of the left display means and the right display means is configured to deactivate in response to a user input while the other of the left display means and the right display means continues to display the piloting information.

18. An aircraft piloting assistance system comprising:
- a wearable display system including a left display and a right display, the left display being viewable by a left eye of a pilot and the right display being viewable by a right eye of a pilot;
- a first microprocessor in communication with the left display and a second microprocessor in communication with the right display, wherein the first processor and second processor are configured to process common piloting information and simultaneously display the common piloting information on the left display and right display, respectively, the first microprocessor displaying the common piloting information on the left display but not on the right display, the second microprocessor displaying the common piloting information on the right display but not on the left display; and
- an interface configured to, in response to a user input, selectively deactivate one of the left display or the right display while leaving the other of the left display or the right display active and displaying piloting information.

19. The aircraft piloting assistance system of claim 18, wherein the common piloting information includes a speed of rotation of a rotary wing, an attitude of the aircraft, an air speed of the aircraft, a barometric altitude of the aircraft, a height of the aircraft, a quantity of fuel remaining on board the aircraft, a load factor of the aircraft, or limit information for a power plant of the aircraft.

* * * * *